United States Patent
Myneni et al.

(10) Patent No.: US 11,641,305 B2
(45) Date of Patent: May 2, 2023

(54) NETWORK DIAGNOSIS IN SOFTWARE-DEFINED NETWORKING (SDN) ENVIRONMENTS

(71) Applicant: VMware, Inc., Palo Alto, CA (US)

(72) Inventors: Sirisha Myneni, Santa Clara, CA (US); Kausum Kumar, Los Gatos, CA (US); Nafisa Mandliwala, Santa Clara, CA (US); Venkatakrishnan Rajagopalan, Santa Clara, CA (US)

(73) Assignee: VMWARE, INC., Palo Alto, CA (US)

( * ) Notice: Subject to any disclaimer, the term of this patent is extended or adjusted under 35 U.S.C. 154(b) by 0 days.

(21) Appl. No.: 16/714,805

(22) Filed: Dec. 16, 2019

(65) Prior Publication Data

US 2021/0184914 A1 Jun. 17, 2021

(51) Int. Cl.
| | | |
|---|---|---|
| *H04L 41/0631* | (2022.01) | |
| *H04L 41/0654* | (2022.01) | |
| *H04L 41/0604* | (2022.01) | |
| *H04L 12/46* | (2006.01) | |
| *H04L 45/02* | (2022.01) | |

(Continued)

(52) U.S. Cl.
CPC ........ *H04L 41/065* (2013.01); *H04L 12/4633* (2013.01); *H04L 12/4641* (2013.01); *H04L 41/0613* (2013.01); *H04L 41/0654* (2013.01); *H04L 45/02* (2013.01); *H04L 69/22* (2013.01); *H04L 45/64* (2013.01)

(58) Field of Classification Search
CPC .............................. H04L 69/22; H04L 41/065
See application file for complete search history.

(56) References Cited

U.S. PATENT DOCUMENTS 5,504,921 A    4/1996  Dev et al.
5,528,516 A *  6/1996  Yemini ............... G06F 11/2257
                                                      702/181

(Continued)

FOREIGN PATENT DOCUMENTS

WO    2013184846 A1    12/2013
WO    2020009784 A1     1/2020

OTHER PUBLICATIONS

Author Unknown, "Virtual Machine Backup Guide," Nov. 2007, 78 pages, VMware, Inc., Palo Alto, California.

(Continued)

*Primary Examiner* — William G Trost, IV
*Assistant Examiner* — Christopher P Cadorna
(74) *Attorney, Agent, or Firm* — Su IP Consulting

(57) ABSTRACT

Example methods and systems are provided for network diagnosis. One example method may comprise: detecting an egress packet and determining whether each of multiple network issues is detected for the egress packet or a datapath between a first virtualized computing instance and a second virtualized computing instance. The method may also comprise: generating network diagnosis code information specifying whether each of the multiple network issues is detected or not detected; generating an encapsulated packet by encapsulating the egress packet with an outer header that specifies the network diagnosis code information; and sending the encapsulated packet towards the second virtualized computing instance to cause a second computer system to perform one or more remediation actions based on the network diagnosis code information.

21 Claims, 6 Drawing Sheets

(51) Int. Cl.
*H04L 69/22* (2022.01)
*H04L 45/64* (2022.01)

(56) References Cited

U.S. PATENT DOCUMENTS

| | | |
|---|---|---|
| 5,550,816 A | 8/1996 | Hardwick et al. |
| 5,729,685 A | 3/1998 | Chatwani et al. |
| 5,751,967 A | 5/1998 | Raab et al. |
| 5,796,936 A | 8/1998 | Watabe et al. |
| 5,825,779 A | 10/1998 | Putnins et al. |
| 6,104,699 A | 8/2000 | Holender et al. |
| 6,219,699 B1 | 4/2001 | McCloghrie et al. |
| 6,512,745 B1 | 1/2003 | Abe et al. |
| 6,539,432 B1 | 3/2003 | Taguchi et al. |
| 6,680,934 B1 | 1/2004 | Cain |
| 6,785,843 B1 | 8/2004 | McRae et al. |
| 6,842,768 B1 | 1/2005 | Shaffer et al. |
| 6,941,487 B1 | 9/2005 | Balakrishnan et al. |
| 6,963,585 B1 | 11/2005 | Pennec et al. |
| 7,079,544 B2 | 7/2006 | Wakayama et al. |
| 7,096,228 B2 | 8/2006 | Theimer et al. |
| 7,197,572 B2 | 3/2007 | Matters et al. |
| 7,200,144 B2 | 4/2007 | Terrell et al. |
| 7,209,439 B2 | 4/2007 | Rawlins et al. |
| 7,286,490 B2 | 10/2007 | Saleh et al. |
| 7,359,971 B2 | 4/2008 | Jorgensen |
| 7,450,598 B2 | 11/2008 | Chen et al. |
| 7,483,370 B1 | 1/2009 | Dayal et al. |
| 7,606,260 B2 | 10/2009 | Oguchi et al. |
| 7,649,851 B2 | 1/2010 | Takashige et al. |
| 7,710,874 B2 | 5/2010 | Balakrishnan et al. |
| 7,730,486 B2 | 6/2010 | Herington |
| 7,792,987 B1 | 9/2010 | Vohra et al. |
| 7,818,452 B2 | 10/2010 | Matthews et al. |
| 7,826,482 B1 | 11/2010 | Minei et al. |
| 7,885,276 B1 | 2/2011 | Lin |
| 7,937,438 B1 | 5/2011 | Miller et al. |
| 7,948,986 B1 | 5/2011 | Ghosh et al. |
| 8,027,354 B1 | 9/2011 | Portolani et al. |
| 8,046,456 B1 | 10/2011 | Miller et al. |
| 8,054,832 B1 | 11/2011 | Shukla et al. |
| 8,055,789 B2 | 11/2011 | Richardson et al. |
| 8,166,201 B2 | 4/2012 | Richardson et al. |
| 8,223,668 B2 | 7/2012 | Allan et al. |
| 8,224,931 B1 | 7/2012 | Brandwine et al. |
| 8,224,971 B1 | 7/2012 | Miller et al. |
| 8,312,129 B1 | 11/2012 | Miller et al. |
| 8,456,984 B2 | 6/2013 | Ranganathan et al. |
| 8,504,718 B2 | 8/2013 | Wang et al. |
| 8,621,058 B2 | 12/2013 | Eswaran et al. |
| 8,644,188 B1 | 2/2014 | Brandwine et al. |
| 8,705,513 B2 | 4/2014 | Merwe et al. |
| 9,021,098 B1 | 4/2015 | Merwe et al. |
| 9,596,126 B2 | 3/2017 | Shen et al. |
| 10,148,484 B2 | 12/2018 | Shen et al. |
| 10,225,270 B2 | 3/2019 | Reddy et al. |
| 10,326,830 B1* | 6/2019 | Singh ............... H04L 67/1004 |
| 10,374,830 B1 | 8/2019 | Datta et al. |
| 2003/0006919 A1 | 1/2003 | Collins et al. |
| 2003/0093481 A1 | 5/2003 | Mitchell et al. |
| 2004/0047286 A1 | 3/2004 | Larsen et al. |
| 2004/0073659 A1 | 4/2004 | Rajsic et al. |
| 2004/0098505 A1 | 5/2004 | Clemmensen |
| 2004/0267897 A1 | 12/2004 | Hill et al. |
| 2005/0018669 A1 | 1/2005 | Arndt et al. |
| 2005/0038834 A1 | 2/2005 | Souder et al. |
| 2005/0083953 A1 | 4/2005 | May |
| 2005/0120160 A1 | 6/2005 | Plouffe et al. |
| 2006/0002370 A1 | 1/2006 | Rabie et al. |
| 2006/0026225 A1 | 2/2006 | Canali et al. |
| 2006/0092940 A1 | 5/2006 | Ansari et al. |
| 2006/0092976 A1 | 5/2006 | Lakshman et al. |
| 2006/0174087 A1 | 8/2006 | Hashimoto et al. |
| 2006/0184937 A1 | 8/2006 | Abels et al. |
| 2006/0193266 A1 | 8/2006 | Siddha et al. |
| 2007/0043860 A1 | 2/2007 | Pabar |
| 2007/0156919 A1 | 7/2007 | Potti et al. |
| 2007/0220059 A1 | 9/2007 | Lu et al. |
| 2007/0220358 A1 | 9/2007 | Goodill et al. |
| 2007/0260721 A1 | 11/2007 | Bose et al. |
| 2007/0283348 A1 | 12/2007 | White |
| 2007/0297428 A1 | 12/2007 | Bose et al. |
| 2008/0002579 A1 | 1/2008 | Lindholm et al. |
| 2008/0040467 A1 | 2/2008 | Mendiratta et al. |
| 2008/0049621 A1 | 2/2008 | McGuire et al. |
| 2008/0059556 A1 | 3/2008 | Greenspan et al. |
| 2008/0071900 A1 | 3/2008 | Hecker et al. |
| 2008/0080559 A1 | 4/2008 | Singh |
| 2008/0159301 A1 | 7/2008 | Heer |
| 2008/0165704 A1 | 7/2008 | Marchetti et al. |
| 2009/0296726 A1 | 12/2009 | Snively et al. |
| 2010/0039296 A1 | 2/2010 | Marggraff et al. |
| 2010/0125667 A1 | 5/2010 | Soundararajan |
| 2010/0169441 A1 | 7/2010 | Lafleur et al. |
| 2010/0177789 A1 | 7/2010 | Chen et al. |
| 2011/0103259 A1 | 5/2011 | Bay et al. |
| 2011/0296052 A1 | 12/2011 | Guo et al. |
| 2012/0051216 A1* | 3/2012 | Zhang ............... H04W 28/0284 370/230 |
| 2012/0075991 A1 | 3/2012 | Sugita et al. |
| 2012/0120964 A1 | 5/2012 | Koponen et al. |
| 2012/0147894 A1 | 6/2012 | Mulligan et al. |
| 2013/0024579 A1 | 1/2013 | Zhang et al. |
| 2013/0044752 A1 | 2/2013 | Koponen et al. |
| 2013/0088997 A1* | 4/2013 | Briscoe ............... H04L 47/32 370/252 |
| 2013/0103817 A1 | 4/2013 | Koponen et al. |
| 2013/0332602 A1 | 12/2013 | Nakil et al. |
| 2013/0332619 A1 | 12/2013 | Xie et al. |
| 2014/0050223 A1 | 2/2014 | Foo et al. |
| 2014/0181829 A1 | 6/2014 | Hathaway et al. |
| 2014/0229944 A1 | 8/2014 | Wang et al. |
| 2014/0241247 A1 | 8/2014 | Kempf et al. |
| 2014/0280836 A1 | 9/2014 | Kumar et al. |
| 2014/0351229 A1 | 11/2014 | Gupta |
| 2014/0355516 A1 | 12/2014 | Baudoin et al. |
| 2015/0009995 A1 | 1/2015 | Gross, IV et al. |
| 2015/0103645 A1 | 4/2015 | Shen et al. |
| 2015/0103661 A1 | 4/2015 | Shen et al. |
| 2015/0195202 A1* | 7/2015 | Ogura ............... H04W 28/0247 370/236 |
| 2016/0099853 A1 | 4/2016 | Nedeltchev et al. |
| 2016/0105377 A1 | 4/2016 | Nakagawa |
| 2016/0330070 A1 | 11/2016 | Datta et al. |
| 2016/0330111 A1 | 11/2016 | Manghirmalani et al. |
| 2017/0078207 A1 | 3/2017 | Atkins et al. |
| 2017/0235774 A1 | 8/2017 | Colgrove et al. |
| 2018/0006935 A1 | 1/2018 | Mutnuru et al. |
| 2018/0270288 A1* | 9/2018 | Wang ............... H04L 29/06 |
| 2019/0028300 A1* | 1/2019 | Mathew ............... H04L 67/10 |
| 2019/0045031 A1 | 2/2019 | Feghali et al. |
| 2019/0075012 A1 | 3/2019 | Shen et al. |
| 2019/0238263 A1* | 8/2019 | Love ............... H03M 13/136 |
| 2020/0014638 A1 | 1/2020 | Chen et al. |
| 2020/0014663 A1 | 1/2020 | Chen et al. |
| 2020/0177458 A1* | 6/2020 | Rahman ............... H04L 41/0631 |

OTHER PUBLICATIONS

Author Unknown, "Apache Cassandra™ 1.2 Documentation," Jan. 13, 2013, 201 pages, DataStax.

International Search Report and Written Opinion of the International Searching Authority, International application No. PCT/US2019/036645 dated Sep. 2, 2019.

* cited by examiner

| P1 | src=IP-VM1,dst=IP-VM3 |
|---|---|
| O1 | src_VTEP=IP-A,dst_VTEP=IP-B,VNI=5000,<br>GENEVE OPTION DATA: DIAG_CODE1=1000* |
| P2 | src=IP-VM6,dst=IP-VM2 |
| O2 | src_VTEP=IP-C,dst_VTEP=IP-A,VNI=6000,<br>GENEVE OPTION DATA: DIAG_CODE2=0100* |

\* DIAG_CODE1={code_i}=[code_0=1,code_1=0,code_2=0,code_3=0]
\* DIAG_CODE2={code_i}=[code_0=0,code_1=1,code_2=0,code_3=0]

NETWORK DIAGNOSIS IN SOFTWARE-DEFINED NETWORKING (SDN) ENVIRONMENTS

BACKGROUND

Virtualization allows the abstraction and pooling of hardware resources to support virtual machines in a Software-Defined Networking (SDN) environment, such as a Software-Defined Data Center (SDDC). For example, through server virtualization, virtualization computing instances such as virtual machines (VMs) running different operating systems may be supported by the same physical machine (e.g., referred to as a "host"). Each VM is generally provisioned with virtual resources to run an operating system and applications. The virtual resources may include central processing unit (CPU) resources, memory resources, storage resources, network resources, etc. In practice, it is desirable to diagnose and troubleshoot various network issues that may affect data-plane connectivity among hosts and VMs.

DETAILED DESCRIPTION

Figure 1:
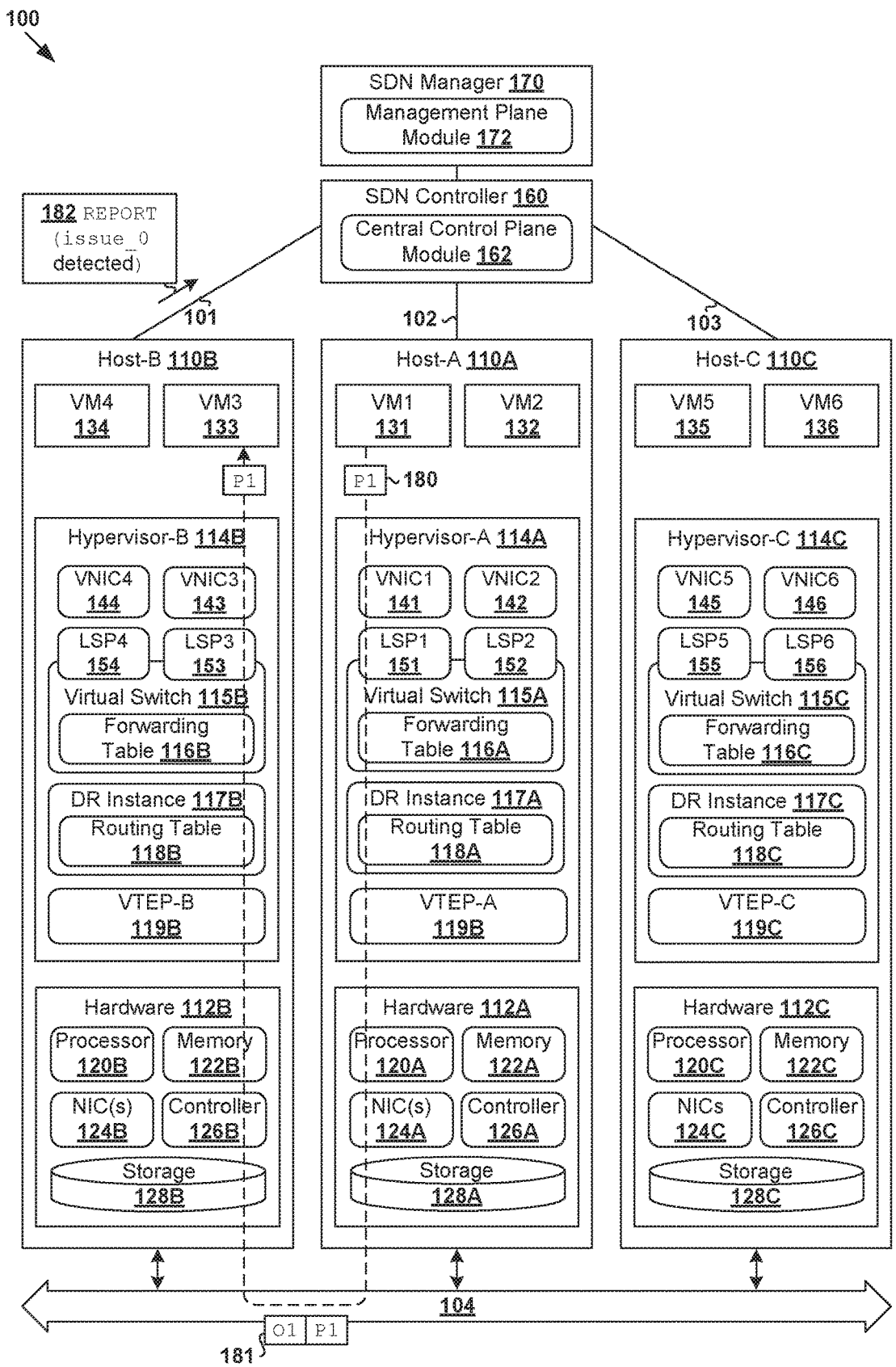
FIG. 1 is a schematic diagram illustrating an example software-defined networking (SDN) environment in which network diagnosis may be performed.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the drawings, can be arranged, substituted, combined, and designed in a wide variety of different configurations, all of which are explicitly contemplated herein. Although the terms "first," "second" and so on are used to describe various elements, these elements should not be limited by these terms. These terms are used to distinguish one element from another. A first element may be referred to as a second element, and vice versa.

Challenges relating to network diagnosis will now be explained in more detail using FIG. 1, which is a schematic diagram illustrating example software-defined networking (SDN) environment 100 in which network diagnosis may be performed. It should be understood that, depending on the desired implementation, SDN environment 100 may include additional and/or alternative components than that shown in FIG. 1. SDN environment 100 includes multiple hosts, such as host-A 110A, host-B 110B and host-C 110C that are inter-connected via physical network 104. In practice, SDN environment 100 may include any number of hosts (also known as a "host computers", "host devices", "physical servers", "server systems", "transport nodes," etc.), where each host may be supporting tens or hundreds of VMs.

Each host 110A/110B/110C may include suitable hardware 112A/112B/112C and virtualization software (e.g., hypervisor-A 114A, hypervisor-B 114B, hypervisor-C 114C) to support various virtual machines (VMs) 131-136. For example, host-A 110A supports VM1 131 and VM2 132; host-B 110B supports VM3 133 and VM4 134; and host-C 110C supports VM5 135 VM6 136. Hypervisor 114A/114B/114C maintains a mapping between underlying hardware 112A/112B/112C and virtual resources allocated to respective VMs 131-136. Hardware 112A/112B/112C includes suitable physical components, such as central processing unit(s) (CPU(s)) or processor(s) 120A/120B/120C; memory 122A/122B/122C; physical network interface controllers (NICs) 124A/124B/124C; and storage disk(s) 126A/126B/126C, etc.

Virtual resources are allocated to respective VMs 131-136 to support a guest operating system (OS) and application(s). For example, the virtual resources may include virtual CPU, guest physical memory, virtual disk, virtual network interface controller (VNIC), etc. Hardware resources may be emulated using virtual machine monitors (VMMs). For example in FIG. 1, VNICs 141-146 are emulated by corresponding VMMs (not shown for simplicity). The VMMs may be considered as part of respective VMs 131-136, or alternatively, separated from VMs 131-136. Although one-to-one relationships are shown, one VM may be associated with multiple VNICs (each VNIC having its own network address).

Although examples of the present disclosure refer to VMs, it should be understood that a "virtual machine" running on a host is merely one example of a "virtualized computing instance" or "workload." A virtualized computing instance may represent an addressable data compute node (DCN) or isolated user space instance. In practice, any suitable technology may be used to provide isolated user space instances, not just hardware virtualization. Other virtualized computing instances may include containers (e.g., running within a VM or on top of a host operating system without the need for a hypervisor or separate operating system or implemented as an operating system level virtualization), virtual private servers, client computers, etc. Such container technology is available from, among others, Docker, Inc. The VMs may also be complete computational environments, containing virtual equivalents of the hardware and software components of a physical computing system.

The term "hypervisor" may refer generally to a software layer or component that supports the execution of multiple virtualized computing instances, including system-level software in guest VMs that supports namespace containers such as Docker, etc. Hypervisors 114A-C may each implement any suitable virtualization technology, such as VMware ESX® or ESXi™ (available from VMware, Inc.), Kernel-based Virtual Machine (KVM), etc. The term "packet" may refer generally to a group of bits that can be transported together, and may be in another form, such as "frame," "message," "segment," etc. The term "traffic" may refer generally to multiple packets. The term "layer-2" may refer generally to a link layer or Media Access Control (MAC) layer; "layer-3" to a network or Internet Protocol (IP) layer; and "layer-4" to a transport layer (e.g., using Transmission Control Protocol (TCP), User Datagram Protocol (UDP), etc.), in the Open System Interconnection (OSI) model, although the concepts described herein may be used with other networking models.

Hypervisor 114A/114B/114C implements virtual switch 115A/115B/115C and logical distributed router (DR) instance 117A/117B/117C to handle egress packets from, and ingress packets to, corresponding VMs 131-136. In SDN environment 100, logical switches and logical DRs may be implemented in a distributed manner and can span multiple hosts to connect VMs 131-136. For example, logical switches that provide logical layer-2 connectivity may be implemented collectively by virtual switches 115A-C and represented internally using forwarding tables 116A-C at respective virtual switches 115A-C. Forwarding tables 116A-C may each include entries that collectively implement the respective logical switches. Further, logical DRs that provide logical layer-3 connectivity may be implemented collectively by DR instances 117A-C and represented internally using routing tables 118A-C at respective DR instances 117A-C. Routing tables 118A-C may each include entries that collectively implement the respective logical DRs.

Packets may be received from, or sent to, each VM via an associated logical switch port. For example, logical switch ports 151-156 (labelled "LSP1" to "LSP6") are associated with respective VMs 131-136. Here, the term "logical port" or "logical switch port" may refer generally to a port on a logical switch to which a virtualized computing instance is connected. A "logical switch" may refer generally to a software-defined networking (SDN) construct that is collectively implemented by virtual switches 115A-C in the example in FIG. 1, whereas a "virtual switch" may refer generally to a software switch or software implementation of a physical switch. In practice, there is usually a one-to-one mapping between a logical port on a logical switch and a virtual port on virtual switch 115A/115B/115C. However, the mapping may change in some scenarios, such as when the logical port is mapped to a different virtual port on a different virtual switch after migration of the corresponding VM (e.g., when the source host and destination host do not have a distributed virtual switch spanning them).

SDN manager 170 and SDN controller 160 are example network management entities in SDN environment 100. To send and receive the control information (e.g., configuration information), each host 110A/110B/110C may implement local control plane (LCP) agent (not shown) to interact with SDN controller 160. For example, control-plane channel 101/102/103 may be established between SDN controller 160 and host 110A/110B/110C using TCP over Secure Sockets Layer (SSL), etc. Management entity 160/170 may be implemented using physical machine(s), virtual machine(s), a combination thereof, etc.

Each host 110A/110B/110C also maintains data-plane connectivity with other host(s) via physical network 104. Hypervisor 114A/114B/114C may implement a virtual tunnel endpoint (VTEP) to encapsulate and decapsulate packets with an outer header (also known as a tunnel header) identifying a logical overlay network (e.g., VNI=6000). To facilitate communication among VMs located on the same logical overlay network, hypervisor-A 114A implements first VTEP-A 119A associated with (IP address=IP-A, MAC address=MAC-A, VTEP label=VTEP-A), hypervisor-B 114B implements second VTEP-B 119B with (IP-B, MAC-B, VTEP-B) and hypervisor-C 114C implements third VTEP-C 119C with (IP-C, MAC-C, VTEP-C). Encapsulated packets may be sent via a logical overlay tunnel established between a pair of VTEPs over physical network 104.

Through virtualization of networking services in SDN environment 100, logical overlay networks may be provisioned, changed, stored, deleted and restored programmatically without having to reconfigure the underlying physical hardware architecture. A logical overlay network (also known as "logical network") may be formed using any suitable tunneling protocol, such as Generic Network Virtualization Encapsulation (GENEVE), Virtual eXtensible Local Area Network (VXLAN), Stateless Transport Tunneling (STT), etc. For example, tunnel encapsulation may be implemented according to a tunneling protocol to extend layer-2 segments across multiple hosts. The term "logical overlay tunnel" may refer generally to a tunnel established between a pair of VTEPs over physical network 104, over which respective hosts are in layer-3 connectivity with one another.

Figure 2:
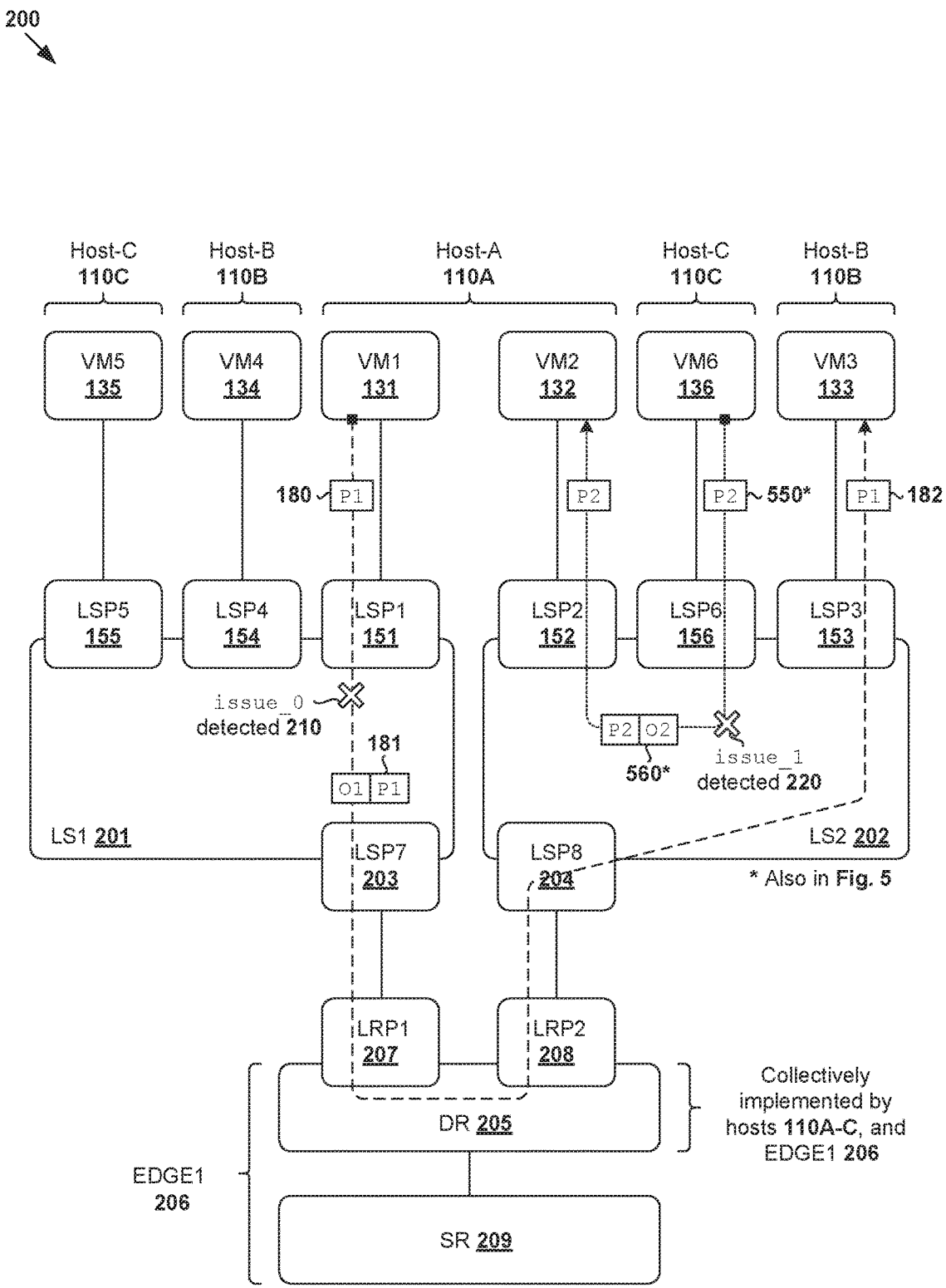
FIG. 2 is a schematic diagram illustrating an example management plane view of the SDN environment in FIG. 1.

Some examples are shown in FIG. 2, which is a schematic diagram illustrating example management plane view 200 of SDN environment 100 in FIG. 1. Here, VM1 131, VM4 134 and VM5 135 are located on a first logical layer-2 segment associated with virtual network identifier (VNI)=5000 and connected to a first logical switch (see "LS1" 201). VM2 132, VM3 133 and VM6 136 are located on a second logical layer-2 segment associated with VNI=6000 and connected to a second logical switch (see "LS2" 202). With the growth of infrastructure-as-a-service (IaaS), multiple logical overlay networks may be deployed to support multiple tenants in SDN environment 100. In this case, each logical overlay network may be designed to be an abstract representation of a tenant's network in SDN environment 100.

A logical DR (see "DR" 205) connects logical switches 201-202 to facilitate communication among VMs 131-136 on different segments. See also logical switch ports "LSP7" 203 and "LSP8" 204, and logical router ports "LRP1" 207 and "LRP2" 208 connecting DR 205 with logical switches 201-202. Logical switch 201/202 may be implemented collectively by multiple transport nodes, such as using virtual switches 115A-C and represented internally using forwarding tables 116A-C. DR 205 may be implemented collectively by multiple transport nodes, such as using edge node 206 and hosts 110A-C. For example, DR 205 may be implemented using DR instances 117A-C and represented internally using routing tables 118A-C at respective hosts 110A-C.

Edge node 206 (labelled "EDGE1") may implement one or more logical DRs and logical service routers (SRs), such as DR 205 and SR 209 in FIG. 2. SR 209 may represent a centralized routing component that provides centralized stateful services to VMs 131-136, such as IP address assignment using dynamic host configuration protocol (DHCP), load balancing, network address translation (NAT), etc. EDGE1 206 may be implemented using VM(s) and/or physical machines (also known as "bare metal machines"), and capable of performing functionalities of a switch, router (e.g., logical service router), bridge, gateway, edge appliance, or any combination thereof. As will be discussed using FIG. 6, EDGE1 206 may be deployed at the edge of a geographical site to facilitate north-south traffic to an external network, such as another data center at a different geographical site.

Depending on the desired implementation, a multi-tier topology may be used to isolate multiple tenants. For example, a two-tier topology includes an upper tier associated with a provider logical router (PLR) and a lower tier associated with a tenant logical router (TLR). Each tier may include both DRs and SRs, or DRs and SRs on the upper tier (known as "tier-0") but only DRs at the lower tier (known "tier-1"). In this case, a logical router may be categorized as one of the following types: TLR-DR, TLR-SR, PLR-DR and PLR-SR. Depending on the desired implementation, DR 205 and SR 209 may be connected via a transit logical switch (not shown in FIG. 2 for simplicity).

Conventionally, one approach for network troubleshooting is to use network tools or utilities such as ping, traceroute, traceflow, etc. However, such network tools necessitate the injection of diagnostic packets into physical network 104, which generally lacks efficiency. As the scale and complexity of SDN environment 100 increases, network troubleshooting and debugging may become increasingly time- and resource-intensive. Any inefficiency relating to network diagnosis and troubleshooting may in turn increase system downtime due to undiagnosed network issues.

Network Diagnosis

According to examples of the present disclosure, network diagnosis may be performed in an improved manner using actual network traffic as a "source of truth" during runtime. Similar to the concept of crowdsourcing, a "packetsourcing" approach may be implemented to encode and report information about network issues experienced by packets. For example, network diagnostic code information (to be explained below) may be added to packets to specify whether network issues are detected or not detected along their datapath. This way, network issues may be identified and reported with higher efficiency and accuracy for troubleshooting purposes. Examples of the present disclosure should be contrasted against the conventional approach of intentionally injecting diagnostic packets into the network.

Figure 3:
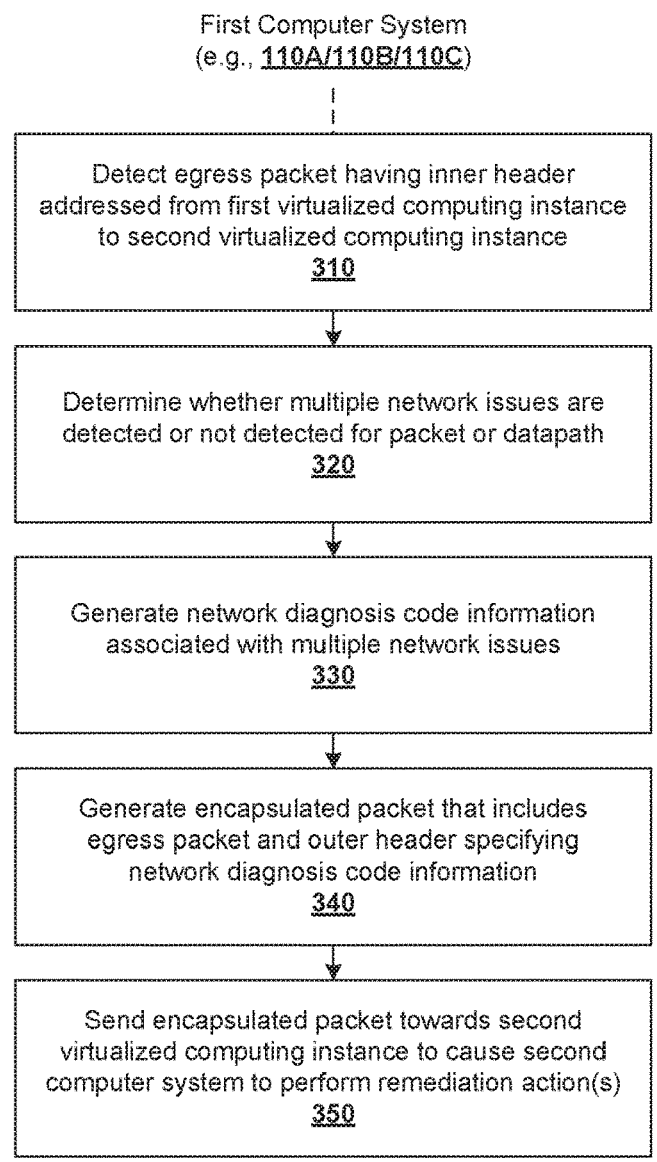
FIG. 3 is a flowchart of an example process for a first computer system to perform network diagnosis in an SDN environment.

In more detail, FIG. 3 is a flowchart of example process 300 for a computer system to perform network diagnosis in SDN environment 100. Example process 300 may include one or more operations, functions, or actions illustrated by one or more blocks, such as 310 to 350. The various blocks may be combined into fewer blocks, divided into additional blocks, and/or eliminated depending on the desired implementation. In practice, example process 300 may be implemented by any suitable "computer system," such as physical host 110A/110B/110C (e.g., using hypervisor 114A/114B/114C) supporting logical forwarding element(s), etc.

Various examples will be explained below using host-A 110A as an example "first computer system," host 110B as "second computer system," source VM1 131 as "first virtualized computing instance," destination VM3 133 as "second virtualized computing instance," etc. The term "logical forwarding element" may refer generally to a logical entity that is supported by a computer system and located on a datapath between a pair of virtualized computing instances, such as a logical switch port, logical switch, logical router port, logical DR, logical SR, edge node, VNIC, etc. From the perspective of the first computer system (e.g., host-A 110A), a "next hop" (in a logical overlay network) may be the second computer system (e.g., host-B 110B) or a logical forwarding element supported by the second computer system.

At 310 in FIG. 3, host-A 110A may detect an egress packet (see 180 in FIG. 1) having an inner header that is addressed from source=VM1 131 to destination=VM3 133. At 320 in FIG. 3, host-A 110A may determine whether each of multiple network issues is detected or not detected for the egress packet or a datapath between VM1 131 and VM3 133. As used herein, the term "network issue" may refer generally to a detectable event, incident or phenomenon associated with packet(s) and/or a datapath being travelled by the packet(s). Example network issues may include network address conflict, reachability issue, congestion issue, latency issue, jitter issue, throughput issue, network parameter configuration issue (e.g., maximum transmission unit (MTU) issue), network security issue, any combination thereof, etc.

Network diagnosis at block 320 may be performed using any suitable logical forwarding element(s), such as an instance of logical switch=LS1 201 that is implemented by virtual switch 115A on host-A 110A, an instance of logical router=DR 205 that is implemented by DR instance 117A on host-A 110A, etc. As explained using FIG. 1, LS1 201 may be collectively implemented using virtual switches 115A-C spanning respective hosts 110A-C. DR 205 may be collectively implemented using DR instances 115A-C spanning respective hosts 110A-C, and EDGE1 206.

At 330 in FIG. 3, host-A 110A may generate network diagnosis code information to indicate whether each of the multiple network issues is detected or not detected. The network diagnosis code information may indicate at least one of the following: detection of a first network issue (e.g., issue_0=network address conflict) and no detection of a second network issue (e.g., issue_1=congestion issue) from the multiple network issues. The term "network diagnosis code information" may refer generally to any suitable information that is configurable to specifying result(s) of a network diagnosis, particularly to indicate the detection, or no detection, of a set of network issues. The network diagnosis code information may be in any suitable format or length, such as a set of numbers, bits, letters, symbols, etc. As will be explained using FIGS. 4, 5 and 6, the network diagnosis code information may be an N-bit bitmap, where N denotes the number of network issues, and the $i^{th}$ bit (code_i) indicates the detection or no detection of the $i^{th}$ network issue.

At 340 in FIG. 3, host-A 110A may generate an encapsulated packet (see 181 in FIG. 1) by encapsulating the egress packet (see 180 in FIG. 1) with an outer header that specifies the network diagnosis code information. As will be discussed using FIGS. 4, 5 and 6, the encapsulated packet may be generated according to a tunneling protocol (e.g., GENEVE) associated with a tunnel connecting VTEP-A 119A on host-A 110A and VTEP-B 119B on host-B 110B. In this case, the outer header (e.g., GENEVE header) may be addressed from host-A 110A to host-B 110B, particularly from source VTEP-A 119A (e.g., source IP=IP-A) to VTEP-B 119B (e.g., destination IP=IP-B).

At 350 in FIG. 3, encapsulated packet 181 may be sent towards destination=VM3 133 to cause host-B 110B to perform remediation action(s) based on the network diagnosis code information. In the example in FIG. 1, in response to receiving an encapsulated packet that includes the network diagnosis code information (see 181), host-B 110B may perform a remediation action, such as by generating and sending a report (see 182) to management entity 160/170. The report is to facilitate troubleshooting of the first network issue (e.g., issue_0=network address conflict).

According to examples of the present disclosure, reports regarding the network issues may be propagated to management entity 160/170 to assist with automatic and/or manual troubleshooting. For example, management entity 160/170 may analyze these reports periodically from packets entering and leaving a node to reduce the likelihood of false positives. When a network issue (issue_i) is not detected anymore, the corresponding network diagnostic code information (code_i) may be reset to indicate no detection. The use of encapsulated packets as a source of truth may also improve the speed and accuracy of identification (and isolation) of network issues in SDN environment 100. Various examples will be discussed below.

Detailed Process

Figure 4:
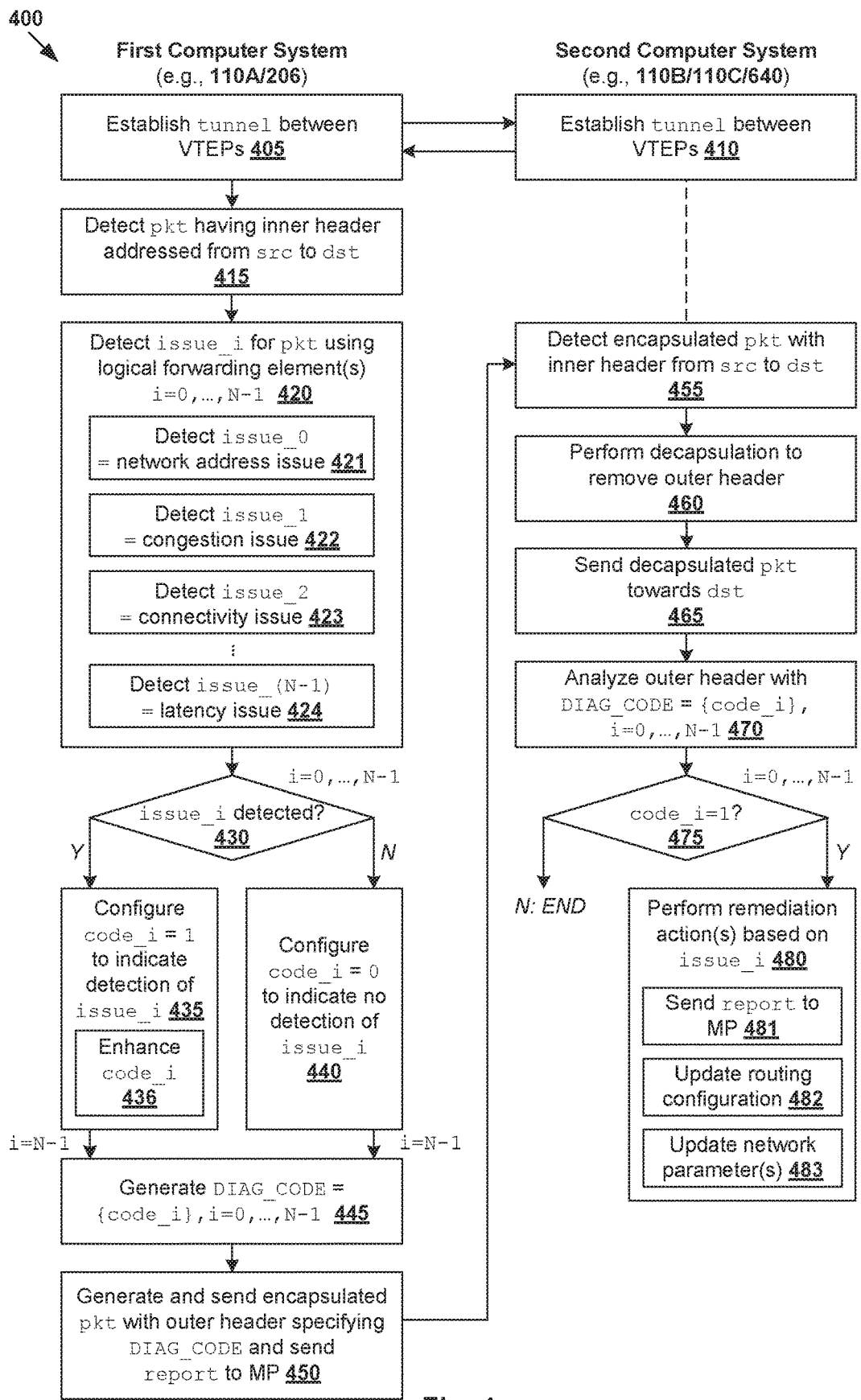
FIG. 4 is a flowchart of an example detailed process for computer systems to perform network diagnosis in an SDN environment.

FIG. 4 is a flowchart of example detailed process 400 for network diagnosis in SDN environment 100. Example process 400 may include one or more operations, functions, or actions illustrated at 405 to 483. The various operations, functions or actions may be combined into fewer blocks, divided into additional blocks, and/or eliminated depending on the desired implementation. The example in FIG. 4 will be explained using FIG. 5, which is a schematic diagram illustrating example network diagnosis 500 in SDN environment 100 in FIG. 1.

Figure 5:
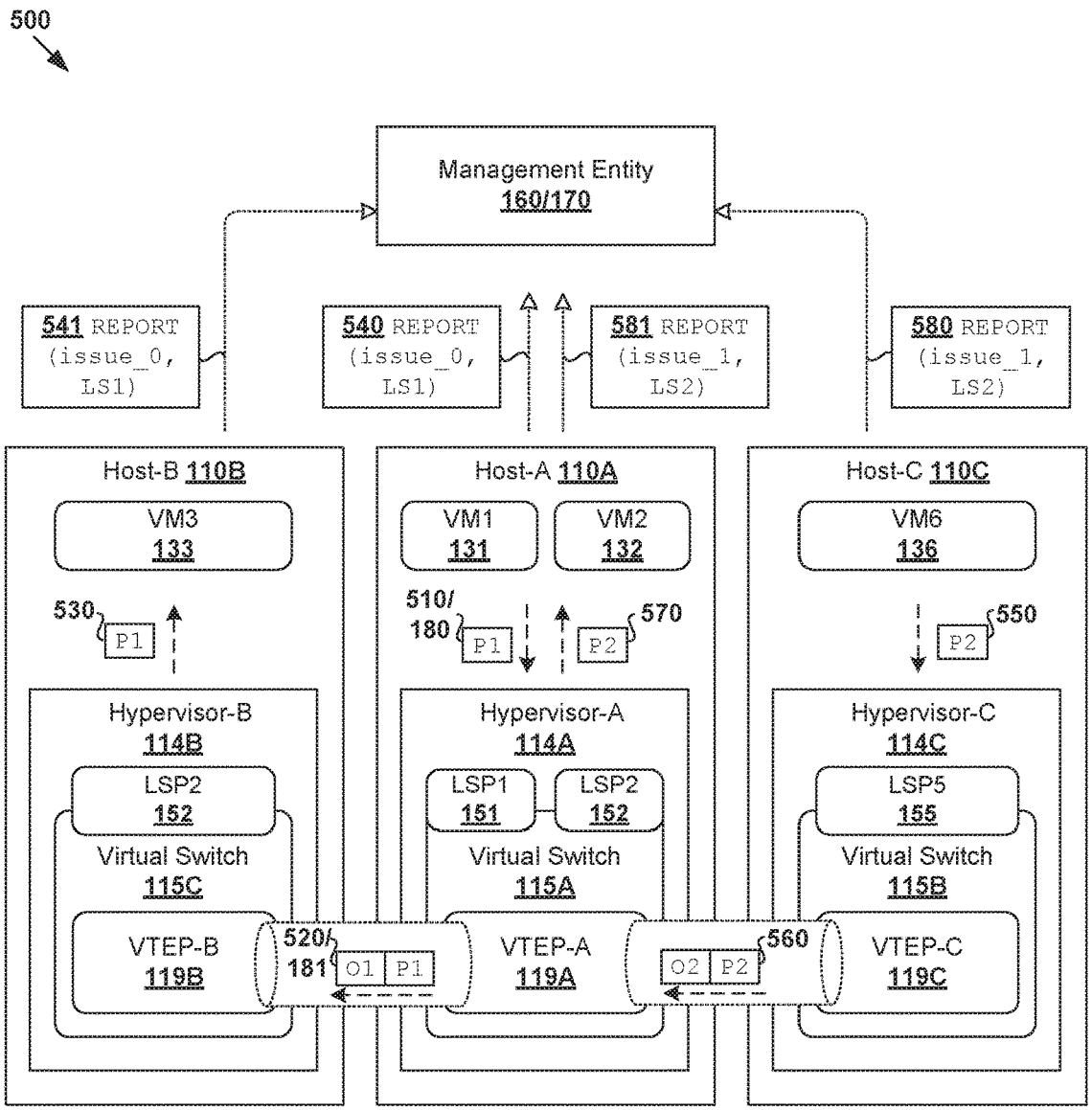
FIG. 5 is a schematic diagram illustrating an example network diagnosis in the SDN environment in FIG. 1.

As described using FIG. 1, hosts 110A-C may communicate via tunnels established among VTEPs 119A-C according to 405-410 in FIG. 4. One example tunneling protocol in FIG. 5 is GENEVE, which is used to establish tunnels that act as backplanes among virtual switches 115A-C residing in respective hypervisors 114A-C. For example, a first tunnel may be established between VTEP-A 119A on host-A 110A and VTEP-B 119B on host-B 110B to facilitate communication between VM1 131 and VM3 133. A second tunnel may be established between VTEP-A 119A and VTEP-C 119C on host-C 110C to facilitate communication between VM2 132 and VM6 136. The tunnels may be established using any suitable transport protocol, such as UDP, etc. In both examples, encapsulated packets transported via the tunnels may be encoded with network diagnosis code information to facilitate network troubleshooting.

(a) Network Diagnosis

Referring to FIG. 4 and FIG. 5, consider a first egress packet (see "P1" 510) from source=VM1 131 to destination=VM3 133. At 415 and 420 in FIG. 4, in response to detecting packet "P1" 510 (see also 180 in FIGS. 1 and 2) with an inner header that is addressed from source IP address=IP-VM1 to destination IP-VM3, host-A 110A (e.g., virtual switch 115A) may perform network diagnosis using logical forwarding element(s) supported by host-A 110A. In practice, a set of N network issues may be considered during network diagnosis, where issue_i denotes the $i^{th}$ network issue and index i=0, 1, . . . , N−1. The set of N network issues may be configured by management entity 160/170, such as based on input from a network administrator.

For i=0 (see 421 in FIG. 4), issue_0 may represent a network address conflict, such as an IPv4 or IPv6 address conflict, etc. For i=1 (see 422), issue_1 may represent a network congestion or slowness issue. For i=2 (see 423), issue_2 may represent a reachability issue, which may be detected when routing tables are incorrectly configured. In this case, the number of hops via which packets are forwarded may be tracked, and the exact logical forwarding element that detects the reachability issue may encode the reachability issue in the outer header. For i=3 (see 424), issue_3 may represent a latency issue. Any additional and/or alternative network issues may be considered, such as jitter issue, throughput issue, network parameter configuration issue (e.g., MTU configuration), network security issue, any combination thereof. Any suitable approach may be implemented to perform network diagnosis at block 420, such as by monitoring a performance metric and comparing the performance metric against a predetermined threshold. The detection of issue_i occurs when the threshold is not satisfied, but otherwise there is no detection. Network congestion may be detected using any suitable approach, such as by tracking a quality of service measure associated with the datapath for comparison with an acceptable threshold.

Any suitable logical forwarding element(s) supported by host-A 110A may be used to detect network issue(s). Referring also to FIG. 2, packet "P1" 510/180 travels from VM1 131 to VM3 133 along a datapath (see dashed line) that includes the following logical forwarding elements: LSP1 151, LS1 201, LSP7 203, LRP1 207, DR 205, LRP2 208, LSP8 204, LS2 202, and LSP4 154. One example may involve configuring an instance of LS1 201 (see 210) implemented by virtual switch 115A to perform network diagnosis at block 420. Any alternative and/or additional logical forwarding element(s) along the datapath may be configured to perform network diagnosis. Depending on the desired implementation, different logical forwarding elements (e.g., LS1 201 and DR 205) may identify different network issues.

(b) Outer Header Insertion

At 430, 435, 440 and 445 in FIG. 4, host-A 110A may generate network diagnosis code information, which is a form of metadata specifying whether particular issue_i is detected or not detected. The network diagnosis code information is denoted as DIAG_CODE={code_i}, which may be a bitmap that includes a set of N codes. For example, the $i^{th}$ code may be code_i=1 (non-zero or true) to indicate detection of issue_i at block 435, or code_i=0 (zero or false) to indicate no detection at block 440. The network diagnosis code information may be a concatenation of code_i, where i=0, 1, . . . , N−1. For example in FIG. 5, DIAG_CODE1="1000" represents a concatenation of code_0=1 for i=0 (i.e., detected issue_0=network address conflict) and code_i=0 for i=1, . . . , 3 (i.e., other issues not detected).

In practice, the network diagnosis code information may be in any suitable format and length. In one example, N bytes may be used to encode N network issues, in which case eight bits are allocated for each code_i. In this case, at 436 in FIG. 4, host-A 110A may enhance code_i to include additional metadata relating to the detection of corresponding issue_i, such as metadata relating to different types of a particular network issue. An example is to differentiate between IPv4 and IPv6 address conflicts. For example, in response to detecting an IPv4 address conflict, the least significant bit of an 8-bit code_0 may be set such that code_0=1. For an IPv6 address conflict, the second least significant bit may be set such that code_0=2. Similar enhancement may be performed to encode additional metadata associated with a particular issue, such as to indicate different levels of congestion, etc.

At 450 in FIG. 4, host-A 110A may generate an encapsulated packet (see 520 in FIG. 5) by encapsulating egress packet "P1" 510 with an outer header (see "O1") specifying DIAG_CODE1={code_i}=1000. In practice, host-A 110A may insert DIAG_CODE1 into any suitable field in the outer header, such as GENEVE option data field in a GENEVE header. Any suitable approach for outer header insertion may be used, such as using a context engine and kernel module(s). Examples of the context engine and kernel module(s) are described in related U.S. patent application Ser. No. 16/028,347, entitled "CONTEXT AWARE MIDDLEBOX SERVICES AT DATACENTER EDGES," filed on Jul. 5, 2018 and U.S. patent application Ser. No. 16/028,342, entitled "CONTEXT AWARE MIDDLEBOX SERVICES AT DATACENTER EDGE," filed on Jul. 5, 2018, which are incorporated herein by reference. In this case, datapaths may be configured with a mechanism (e.g., application programming interface) that allows a kernel module supported by host-A 110A to insert DIAG_CODE into the outer header. The kernel module may register for an input/output (I/O) callback to get notified about egress packets (e.g., "P1" 510) and perform GENEVE header insertion accordingly.

Further, at 450 in FIG. 4, host-A 110A may generate send the encapsulated packet towards destination VM3 133 over a tunnel connecting VTEP-A 119A and VTEP-B 119B. Host-A 110A may also report any detected network issue to management entity 160/170 for troubleshooting purposes. See report 540 in FIG. 5, which specifies the detection of issue_0=IP address conflict by host-A 110A using LS1 201 supported by virtual switch 115A.

(c) Remediation Action(s)

At 455, 460 and 465 in FIG. 4, in response to receiving an encapsulated packet (see 520 in FIG. 5), host-B 110B may perform decapsulation and send a decapsulated packet (see 530 in FIG. 5) towards VM3 133. Further, at 470, 475 and 480 in FIG. 4, host-B 110B may analyze DIAG_CODE={code_i}=1000 in the outer header and perform remediation action(s) based on any detected network issue(s). Example remediation actions include generating and sending a report to the management plane (see 481), updating a routing configuration (e.g., select a less congested route on the return path; see 482), updating network parameter (e.g., adjusting an MTU size; see 483), requesting host-A 110A to perform updates, any combination thereof, etc. For example, at 541 in FIG. 5, host-B 110B reports the detection of issue_0=IP address conflict to management entity 160/170.

According to examples of the present disclosure, whenever a logical forwarding element detects a potential network issue (issue_i), the network diagnosis code information (code_i) for that particular issue may be configured to indicate the detection accordingly. Based on the network diagnosis code information (code_i), a next hop along the datapath may perform a remediation action, such as by raising an alarm to notify the management plane about the potential network issue in the logical overlay network. This allows management entity 160/170 to act in a proactive manner to troubleshoot network issues in SDN environment 100. By propagating network diagnosis results to the management plane, the risk of false positives may also be reduced, if not eliminated. For example, management entity 160/170 may decide how to best use the reports from various hosts 110A-B, such as by making use of the underlying context of each network issue or simply use the counts of the issues to reduce or eliminate false positives.

The above examples are also applicable to the communication between source=VM6 136 to destination=VM2 132 in FIG. 5. In this case, host-C 110C supporting VM6 136 may act as a "first computer system," and host-A 110A as a "second computer system." A logical view of the datapath between VM6 136 and VM2 132 is shown in FIG. 2. Here, consider that a congestion issue (issue_1) is detected by an instance of LS2 202 that is implemented by virtual switch 115C on host-C 110C (see 220 in FIG. 2). Any alternative and/or additional logical forwarding element(s) may be configured to perform network diagnosis, such as LSP6 156, LSP2 152, any combination thereof, etc.

In response to detecting the congestion issue, host-C 110C may generate an encapsulated packet (see 560 in FIG. 5) by encapsulating egress packet "P2" 550 with an outer header (see "02") specifying DIAG_CODE2={code_i}. In particular, DIAG_CODE2=0100 specifies the detection of issue_1 (i.e., code_1=1) and no detection of other issues (i.e., code_i=0 for i=0, 2, 3). Host-C 110C may then send the encapsulated packet (see 560) to host-A 110A, and send a report (see 580) to management entity 160/170. See corresponding 415-450 in FIG. 4.

At host-A 110A, a decapsulated packet (see 570) is sent to destination VM2 132. Based on DIAG_CODE2=0100, remediation action(s) may be performed. For example, host-A 110A may report (see 581) the congestion issue to management entity 160/170 to facilitate automatic troubleshooting to resolve the issue and/or manual process by a network administrator. Based on the detected congestion issue, host-A 110A may update a routing configuration by sending a request to source host-C 110C to slow down its egress packet rate, select a different route, etc. See corresponding 455-480 in FIG. 4.

Cross-Cloud Network Diagnosis

Figure 6:
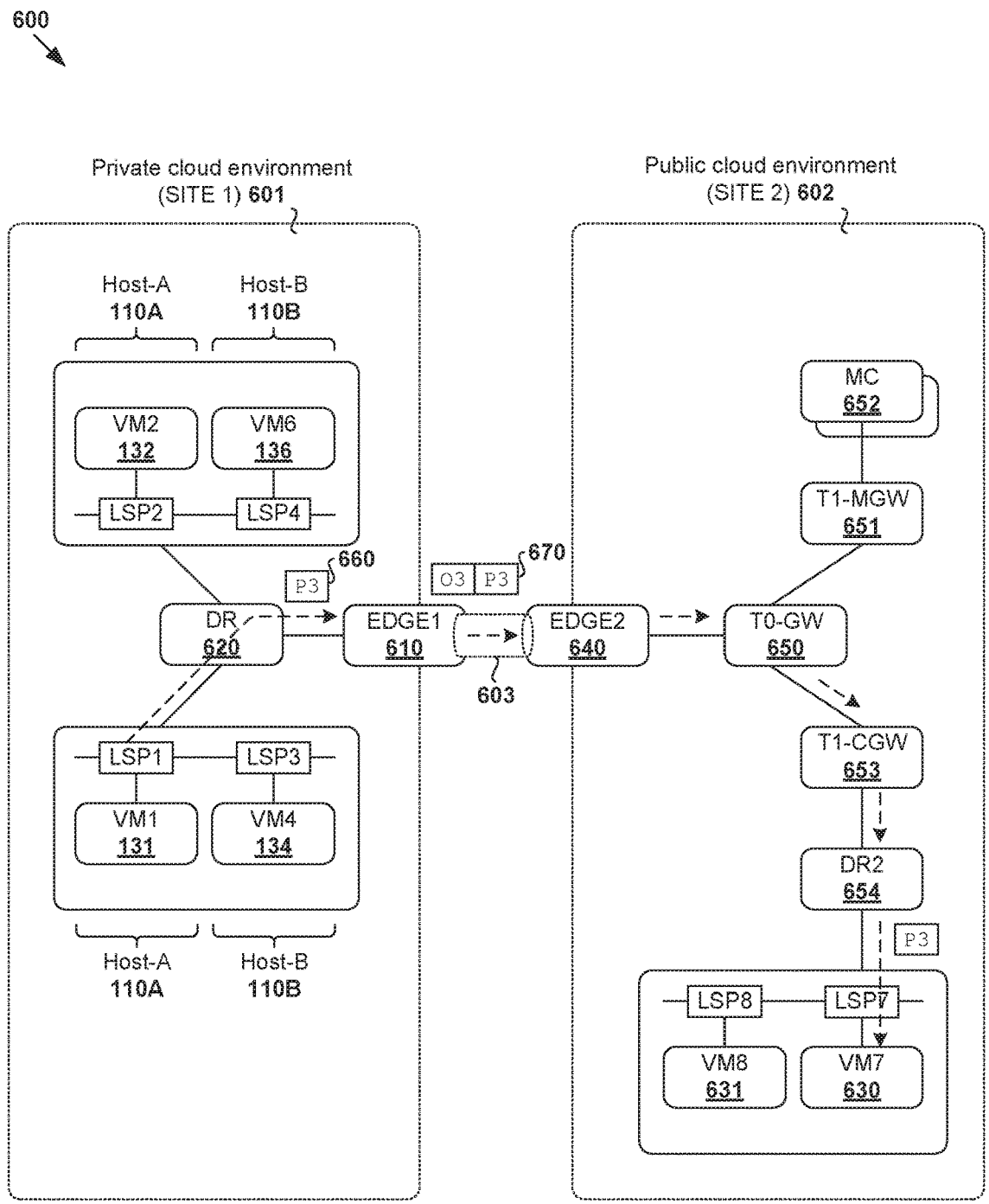
FIG. 6 is a schematic diagram illustrating example cross-cloud network diagnosis in an SDN environment.

Examples of the present disclosure may be implemented for SDN environments with cross-cloud connectivity. FIG. 6 is a schematic diagram illustrating example cross-cloud network diagnosis 600 in an SDN environment. In this example, SDN environment 600 spans across multiple geographical sites, such as a first geographical site where private cloud environment 601 ("first cloud environment") is located, a second geographical site where public cloud environment 602 ("second cloud environment") is located, etc. In practice, the term "private cloud environment" may refer generally to an on-premise data center or cloud platform supported by infrastructure that is under an organization's private ownership and control. In contrast, the term "public cloud environment" may refer generally a cloud platform supported by infrastructure that is under the ownership and control of a public cloud provider.

In practice, a public cloud provider is generally an entity that offers a cloud-based platform to multiple users or tenants. This way, a user may take advantage of the scalability and flexibility provided by public cloud environment 602 for data center capacity extension, disaster recovery, etc. Depending on the desired implementation, public cloud environment 602 may be implemented using any suitable cloud technology, such as Amazon Web Services® (AWS) and Amazon Virtual Private Clouds (VPCs); VMware Cloud™ on AWS; Microsoft Azure®; Google Cloud Platform™, IBM Cloud™; a combination thereof, etc. Amazon VPC and Amazon AWS are registered trademarks of Amazon Technologies, Inc.

In the example in FIG. 6, public cloud environment 602 will be exemplified using VMware Cloud™ on AWS. It should be understood that any additional and/or additional cloud technology may be implemented. EDGE1 610 is deployed at the edge of private cloud environment 601 to handle traffic to and from public cloud environment 602. EDGE1 610 is connected with public cloud environment 602 via EDGE2 640 (e.g., virtual gateway) that is connected with tier-1 management gateway 651 (labelled "T1-MGW") and tier-1 compute gateway 653 (labelled "T1-CGW") via tier-0 gateway 650 (labelled "T0-GW"). In practice, T0-GW 650, MGW 651 and CGW 653 may be logical constructs that are implemented by an edge appliance in public cloud environment 602.

T1-MGW 651 may be deployed to handle management-related traffic to and/or from management component(s) 652 (labelled "MC") for managing various entities within public cloud environment 602. T1-CGW 653 may be deployed to handle workload-related traffic to and/or from VMs, such as VM7 631 and VM8 632. EDGE1 610 in private cloud environment 601 may communicate with EDGE2 640 in public cloud environment 602 using any suitable tunnel(s) 603, such as GRE, Internet Protocol Security (IPSec), layer-2 virtual private network (L2VPN), direct connection, etc. This way, VM1 131 in private cloud environment 601 may send packets to VM7 631 in public cloud environment 602 via tunnel 603.

According to examples of the present disclosure, cross-cloud network diagnosis may be implemented using EDGE1 610 acting as a "first computer system" and EDGE2 640 as a "second computer system" in the example in FIG. 4. In this case, in response to detecting egress packet "P3" 660, EDGE1 610 may perform network diagnosis and encode network diagnosis code information about different network issues in an outer header (labelled "O3"). Similar to the example in FIG. 5, the network diagnosis code information may be in the form of DIAG_CODE2={code_i}=010001, which specifies that the detection of issue_1 and issue_5, and no detection of other issues (i.e., issue_0, issue_2, issue_3 and issue_4). The set of N=6 cross-cloud network issues to be diagnosed may be configured in any suitable manner.

Based on the network diagnosis, EDGE1 610 may generate and send encapsulated packet 670 to EDGE2 640 over tunnel 603. Using GRE (or VPN) as an example, the network diagnosis code information may be inserted into a GRE (or VPN) header. In the case of GRE, the outer header (O3) may include a GRE header specifying the network diagnosis code information, and an outer delivery IP header that is addressed from tunnel source=IP-EDGE1 associated with EDGE1 610 and tunnel destination=IP-EDGE2 associated with EDGE2 640.

In response to receiving encapsulated packet 670, EDGE2 640 may analyze DIAG_CODE2={code_i}=010001 and perform any suitable remediation action to resolve the detected network issues (e.g., of issue_1 and issue_5). This may involve generating and sending a report to a management entity (not shown), performing configuration changes, requesting EDGE1 610 to perform configuration changes, etc. EDGE2 640 may also forward decapsulated packet "P3" to destination VM7 630. For example, in response to detecting a congestion issue associated with a server deployed in public cloud environment 102, appropriate backoff actions may be applied to clients deployed in private cloud environment 101 (e.g., on-prem data center) to reduce server workload and therefore congestion. Depending on the desired implementation, other examples explained using FIG. 4 and FIG. 5 are also applicable to the cross-cloud example in FIG. 6.

Based on the above, examples of the present disclosure may be implemented to identify network health parameters and potential bottlenecks in in a proactive manner. This facilitates better routing decisions and reduces the likelihood of traffic loss and network outages.

Container Implementation

Although explained using VMs, it should be understood that SDN environment 100 may include other virtual workloads, such as containers, etc. As used herein, the term "container" (also known as "container instance") is used generally to describe an application that is encapsulated with all its dependencies (e.g., binaries, libraries, etc.). In the examples in FIG. 1 to FIG. 6, container technologies may be used to run various containers inside respective VMs. Containers are "OS-less", meaning that they do not include any OS that could weigh 10 s of Gigabytes (GB). This makes containers more lightweight, portable, efficient and suitable for delivery into an isolated OS environment. Running containers inside a VM (known as "containers-on-virtual-machine" approach) not only leverages the benefits of container technologies but also that of virtualization technologies. The containers may be executed as isolated processes inside respective VMs.

Computer System

The above examples can be implemented by hardware (including hardware logic circuitry), software or firmware or a combination thereof. The above examples may be implemented by any suitable computing device, computer system, etc. The computer system may include processor(s), memory unit(s) and physical NIC(s) that may communicate with each other via a communication bus, etc. The computer system may include a non-transitory computer-readable medium having stored thereon instructions or program code that, when executed by the processor, cause the processor to perform process(es) described herein with reference to FIG. 1 to FIG. 6. For example, the instructions or program code, when executed by the processor of the computer system, may cause the processor to perform network troubleshooting according to examples of the present disclosure.

The techniques introduced above can be implemented in special-purpose hardwired circuitry, in software and/or firmware in conjunction with programmable circuitry, or in a combination thereof. Special-purpose hardwired circuitry may be in the form of, for example, one or more application-specific integrated circuits (ASICs), programmable logic devices (PLDs), field-programmable gate arrays (FPGAs), and others. The term 'processor' is to be interpreted broadly to include a processing unit, ASIC, logic unit, or programmable gate array etc.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or any combination thereof.

Those skilled in the art will recognize that some aspects of the embodiments disclosed herein, in whole or in part, can be equivalently implemented in integrated circuits, as one or more computer programs running on one or more computers (e.g., as one or more programs running on one or more computing systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure.

Software and/or other instructions to implement the techniques introduced here may be stored on a non-transitory computer-readable storage medium and may be executed by one or more general-purpose or special-purpose programmable microprocessors. A "computer-readable storage medium", as the term is used herein, includes any mechanism that provides (i.e., stores and/or transmits) information in a form accessible by a machine (e.g., a computer, network device, personal digital assistant (PDA), mobile device, manufacturing tool, any device with a set of one or more processors, etc.). A computer-readable storage medium may include recordable/non recordable media (e.g., read-only memory (ROM), random access memory (RAM), magnetic disk or optical storage media, flash memory devices, etc.).

The drawings are only illustrations of an example, wherein the units or procedure shown in the drawings are not necessarily essential for implementing the present disclosure. Those skilled in the art will understand that the units in the device in the examples can be arranged in the device in the examples as described, or can be alternatively located in one or more devices different from that in the examples. The units in the examples described can be combined into one module or further divided into a plurality of sub-units.

We claim:

1. A method for a first computer system to perform network diagnosis, the method comprising:
   detecting an egress packet having an inner header that is addressed from a first virtualized computing instance to a second virtualized computing instance;
   determining, by one or more logical forwarding elements supported by the first computer system, whether each of multiple network issues is detected for the egress packet or a datapath between the first virtualized computing instance and the second virtualized computing instance;
   generating network diagnosis code information specifying whether each of the multiple network issues is detected or not detected, wherein the network diagnosis code information specifies: a first code that indicates whether or not there is detection of a first network issue from the multiple network issues and a second code that indicates whether or not there is detection of a second network issue from the multiple network issues, wherein the second code is concatenated with the first code in the network diagnosis code information, wherein the network diagnosis code information includes a plurality of bits at a respective plurality of bit positions, wherein the first code is indicated at a first bit position of the plurality of bit positions, and wherein the second code is concatenated with the first code by being indicated at a second bit position of the plurality of bit positions;
   generating an encapsulated packet by encapsulating the egress packet with an outer header that specifies the network diagnosis code information having the concatenated first and second codes and is addressed from the first computer system to a second computer system; and
   sending the encapsulated packet towards the second virtualized computing instance to cause a second computer system to perform one or more remediation actions based on the network diagnosis code information.

2. The method of claim 1, wherein generating the network diagnosis code information comprises:
   generating the network diagnosis code information includes generating multiple codes each associated with a respective one of the multiple network issues, wherein the first code is set to indicate the detection of the first network issue, and the second code is set to indicate no detection of the second network issue.

3. The method of claim 2, wherein generating the network diagnosis code information comprises:
   generating the network diagnosis code information in a form of a bitmap that includes multiple codes that are each set to either non-zero to indicate detection or zero to indicate no detection.

4. The method of claim 1, wherein generating the encapsulated packet comprises:
   configuring the outer header according to a tunnelling protocol associated with a tunnel connecting a first virtual tunnel endpoint supported by the first computer system and a second virtual tunnel endpoint supported by the second computer system.

5. The method of claim 1, wherein determining whether each of the multiple network issues is detected comprises:
   determining whether one or more of: a network address conflict, reachability issue, congestion issue, latency issue, jitter issue, throughput issue, network parameter configuration issue, and network security issue is detected or not detected.

6. The method of claim 1, further comprising:
   receiving, from the second computer system, an encapsulated ingress packet that includes an ingress outer header specifying ingress network diagnosis code information generated by the second computer system; and
   in response to determination that the ingress network diagnosis code information indicates detection of a particular network issue, performing one or more remediation actions based on the ingress network diagnosis code information.

7. The method of claim 6, further comprising:
   performing one or more remediation actions that include: reporting the detection of the particular network issue to a management entity, updating a routing configuration, and updating a network parameter.

8. A non-transitory computer-readable storage medium that includes a set of instructions which, in response to execution by a processor of a first computer system, cause the processor to perform a method of network diagnosis, wherein the method comprises:
   detecting an egress packet having an inner header that is addressed from a first virtualized computing instance to a second virtualized computing instance;
   determining, by one or more logical forwarding elements supported by the first computer system, whether each of multiple network issues is detected for the egress packet or a datapath between the first virtualized computing instance and the second virtualized computing instance;
   generating network diagnosis code information specifying whether each of the multiple network issues is detected or not detected, wherein the network diagnosis code information specifies: a first code that indicates whether or not there is detection of a first network issue from the multiple network issues and a second code that indicates whether or not there is detection of a second network issue from the multiple network issues, wherein the second code is concatenated with the first code in the network diagnosis code information, wherein the network diagnosis code information includes a plurality of bits at a respective plurality of bit positions, wherein the first code is indicated at a first bit position of the plurality of bit positions, and wherein the second code is concatenated with the first code by being indicated at a second bit position of the plurality of bit positions;
   generating an encapsulated packet by encapsulating the egress packet with an outer header that specifies the network diagnosis code information having the concatenated first and second codes and is addressed from the first computer system to a second computer system; and
   sending the encapsulated packet towards the second virtualized computing instance to cause a second computer system to perform one or more remediation actions based on the network diagnosis code information.

9. The non-transitory computer-readable storage medium of claim 8, wherein generating the network diagnosis code information comprises:

generating the network diagnosis code information includes generating multiple codes each associated with a respective one of the multiple network issues, wherein the first code is set to indicate the detection of the first network issue, and the second code is set to indicate no detection of the second network issue.

10. The non-transitory computer-readable storage medium of claim 9, wherein generating the network diagnosis code information comprises:
generating the network diagnosis code information in a form of a bitmap that includes multiple codes that are each set to either non-zero to indicate detection or zero to indicate no detection.

11. The non-transitory computer-readable storage medium of claim 8, wherein generating the encapsulated packet comprises:
configuring the outer header according to a tunnelling protocol associated with a tunnel connecting a first virtual tunnel endpoint supported by the first computer system and a second virtual tunnel endpoint supported by the second computer system.

12. The non-transitory computer-readable storage medium of claim 8, wherein determining whether each of the multiple network issues is detected comprises:
determining whether one or more of: a network address conflict, reachability issue, congestion issue, latency issue, jitter issue, throughput issue, network parameter configuration issue, and network security issue is detected or not detected.

13. The non-transitory computer-readable storage medium of claim 8, wherein the method further comprises:
receiving, from the second computer system, an encapsulated ingress packet that includes an ingress outer header specifying ingress network diagnosis code information generated by the second computer system; and
in response to determination that the ingress network diagnosis code information indicates detection of a particular network issue, performing one or more remediation actions based on the ingress network diagnosis code information.

14. The non-transitory computer-readable storage medium of claim 13, wherein the method further comprises:
performing one or more remediation actions that include: reporting the detection of the particular network issue to a management entity, updating a routing configuration, and updating a network parameter.

15. A computer system, comprising:
a processor; and
a non-transitory computer-readable medium having stored thereon instructions that, in response to execution by the processor, cause the processor to:
detect an egress packet having an inner header that is addressed from a first virtualized computing instance to a second virtualized computing instance;
determine, by one or more logical forwarding elements supported by the computer system, whether each of multiple network issues is detected for the egress packet or a datapath between the first virtualized computing instance and the second virtualized computing instance;
generate network diagnosis code information specifying whether each of the multiple network issues is detected or not detected, wherein the network diagnosis code information specifies: a first code that indicates whether or not there is detection of a first network issue from the multiple network issues and a second code that indicates whether or not there is detection of a second network issue from the multiple network issues, wherein the second code is concatenated with the first code in the network diagnosis code information, wherein the network diagnosis code information includes a plurality of bits at a respective plurality of bit positions, wherein the first code is indicated at a first bit position of the plurality of bit positions, and wherein the second code is concatenated with the first code by being indicated at a second bit position of the plurality of bit positions;
generate an encapsulated packet by encapsulating the egress packet with an outer header that specifies the network diagnosis code information having the concatenated first and second codes and is addressed from the computer system to a next hop; and
send the encapsulated packet towards the second virtualized computing instance to cause the next hop to perform one or more remediation actions based on the network diagnosis code information.

16. The computer system of claim 15, wherein the instructions that cause the processor to generate the network diagnosis code information cause the processor to:
generate multiple codes each associated with a respective one of the multiple network issues, wherein the first code is set to indicate the detection of the first network issue, and the second code is set to indicate no detection of the second network issue.

17. The computer system of claim 16, wherein the instructions that cause the processor to generate the network diagnosis code information cause the processor to:
generate the network diagnosis code information in a form of a bitmap that includes multiple codes that are each set to either non-zero to indicate detection or zero to indicate no detection.

18. The computer system of claim 15, wherein the instructions that cause the processor to generate the encapsulated packet cause the processor to:
configure the outer header according to a tunnelling protocol associated with a tunnel connecting a first virtual tunnel endpoint supported by the computer system and a second virtual tunnel endpoint supported by the next hop.

19. The computer system of claim 15, wherein the instructions that cause the processor to determine whether each of the multiple network issues is detected cause the processor to:
determine whether one or more of: a network address conflict, reachability issue, congestion issue, latency issue, jitter issue, throughput issue, network parameter configuration issue, and network security issue is detected or not detected.

20. The computer system of claim 15, wherein the instructions further cause the processor to:
receive, from the next hop, an encapsulated ingress packet that includes an ingress outer header specifying ingress network diagnosis code information generated by the next hop; and
in response to determination that the ingress network diagnosis code information indicates detection of a particular network issue, perform one or more remediation actions based on the ingress network diagnosis code information.

21. The computer system of claim 20, wherein the instructions further cause the processor to:
  perform one or more remediation actions that include: reporting the detection of the particular network issue to a management entity, updating a routing configuration, and updating a network parameter.

* * * * *